(12) United States Patent
Barthoulot et al.

(10) Patent No.: US 9,446,862 B2
(45) Date of Patent: Sep. 20, 2016

(54) CRYOGENIC THRUSTER ASSEMBLY USING REGENERATIVE HEATING FROM MAIN AND SETTLING THRUSTERS

(75) Inventors: Jean-Luc Barthoulot, Panilleuse (FR); Didier Vuillamy, Quincampoix (FR); Jean-Michel Sannino, Saint-Marcel (FR)

(73) Assignee: SNECMA, Paris (FR)

( * ) Notice: Subject to any disclaimer, the term of this patent is extended or adjusted under 35 U.S.C. 154(b) by 275 days.

(21) Appl. No.: 14/127,055

(22) PCT Filed: Jun. 7, 2012

(86) PCT No.: PCT/FR2012/051283
§ 371 (c)(1),
(2), (4) Date: Mar. 25, 2014

(87) PCT Pub. No.: WO2012/172238
PCT Pub. Date: Dec. 20, 2012

(65) Prior Publication Data
US 2014/0203148 A1    Jul. 24, 2014

(30) Foreign Application Priority Data

Jun. 17, 2011 (FR) .................................. 11 55315

(51) Int. Cl.
| | |
|---|---|
| B64G 1/40 | (2006.01) |
| F02K 9/50 | (2006.01) |
| F02K 9/88 | (2006.01) |
| F02K 9/94 | (2006.01) |
| B64G 1/00 | (2006.01) |
| F02K 9/64 | (2006.01) |

(52) U.S. Cl.
CPC ............... *B64G 1/401* (2013.01); *B64G 1/002* (2013.01); *B64G 1/402* (2013.01); *F02K 9/50* (2013.01); *F02K 9/64* (2013.01); *F02K 9/88* (2013.01); *F02K 9/94* (2013.01)

(58) Field of Classification Search
CPC .............. F02K 9/94; F02K 9/64; F02K 9/88; F02K 9/50; B64G 1/402
See application file for complete search history.

(56) References Cited

U.S. PATENT DOCUMENTS

| | | | |
|---|---|---|---|
| 2,683,963 A | 7/1954 | Chandler | |
| 5,444,973 A * | 8/1995 | Limerick | ............... B64G 1/401 60/204 |

(Continued)

FOREIGN PATENT DOCUMENTS

| | | |
|---|---|---|
| EP | 1 241 341 | 9/2002 |
| WO | 03 078818 | 9/2003 |

OTHER PUBLICATIONS

International Search Report Issued Oct. 8, 2012 in PCT/FR12/051283 Filed Jun. 7, 2012.

*Primary Examiner* — Phutthiwat Wongwian
*Assistant Examiner* — William Breazeal
(74) *Attorney, Agent, or Firm* — Oblon, McClelland, Maier & Neustadt, L.L.P.

(57) ABSTRACT

A cryogenic thruster assembly including: a reignitable main thruster; a first cryogenic tank connected to the main thruster to feed the main thruster with a first propellant; a first gas tank; at least one settling thruster; and a first feed circuit for feeding the first gas tank. The feed circuit of the first gas tank is connected to the first cryogenic tank and includes a heat exchanger for using heat given off by the at least one settling thruster to vaporize a liquid flow of the first propellant as extracted from the first cryogenic tank to feed the first gas tank with the first propellant in the gaseous state. A method feeds the first gas tank with the first propellant in the gaseous state.

8 Claims, 5 Drawing Sheets

(56) References Cited

U.S. PATENT DOCUMENTS 8,047,472 B1* 11/2011 Brand .................... B64D 17/04
244/158.1

2002/0139902 A1  10/2002 Valentian
2012/0227374 A1* 9/2012 Zegler ..................... F02K 9/44
60/204

* cited by examiner

CRYOGENIC THRUSTER ASSEMBLY USING REGENERATIVE HEATING FROM MAIN AND SETTLING THRUSTERS

The present invention relates to the field of cryogenic propulsion, and more particularly to a cryogenic thruster assembly comprising at least one reignitable main thruster, a first cryogenic tank connected to the main thruster in order to feed it with a first propellant, a first gas tank, and at least one settling thruster, and the invention also relates to a method of feeding the first gas tank with the first propellant in the gaseous state.

In vehicles and in particular rocket engines that are propelled by reaction thrusters fed by cryogenic propellants, such as for example liquid hydrogen and oxygen, the tanks for those cryogenic propellants are normally depressurized during ballistic stages of flight down to the saturation pressure of each of the propellants so as to be able to keep control over the temperature of the cryogenic propellants.

Nevertheless, if the thruster is to be restarted after a ballistic stage, the cryogenic propellant tank is then repressurized so that the propellant is at a pressure that is compatible with engine feed conditions. The repressurization systems conventionally used make use of a repressurization gas, such as helium, which gas is stored at high pressure. Examples of such prior art repressurization systems are disclosed, by way of example, in the following Russian patent applications: RU 2 159 348 C1, RU 2 159 861, RU 2 177 070 C2, RU 2 119 082 C2, RU 2 132 477 C1, RU 2 339 833 C2, and RU 2 339 835 C2. Nevertheless, that solution presents the drawback of requiring repressurization gas to be carried on board the vehicle. Thus, a mass of 20 kilograms (kg) of helium will normally be required for repressurizing a 60 cubic meter ($m^3$) tank of liquid hydrogen. A helium tank containing that mass of helium in the gaseous state at high pressure (about 200 bars) will typically have a total mass of 200 kg. That additional mass is carried on board the vehicle to the detriment of its payload. In addition, it needs to be multiplied by the number of times the cryogenic tank will need to be repressurized after a prolonged ballistic stage.

In the thruster assembly of the S-IV-B stage of the Saturn V launcher, the repressurization gas was stored in the liquid state, thereby enabling the storage mass to be reduced by about 30%. Nevertheless, that reduction is compensated at least in part by the need then to have heater means, which also adds complexity to the system for feeding the engine with propellant. Similar drawbacks are also to be found in a system making use of repressurization gas generators, such as that disclosed in RU 2 147 344.

In order to avoid those drawbacks, certain prior art cryogenic thruster assemblies, in particular on board the Saturn V (J2 engine) and H2A launchers and also on the space shuttle STS, vaporized a fraction of at least one of the cryogenic propellants for repressurization purposes. Nevertheless, that alternative also normally requires the presence of separate heater means or a branch connection for a flow of propellant in the gaseous state as heated by the main thruster. Although heater means normally imply additional mass, a branch connection of a propellant flow that has been vaporized by the main thruster can deliver the propellant in the gaseous state only when the main thruster is in operation, which means that it is still necessary to store a sufficient quantity of propellant in the gaseous state for repressurization throughout the duration of a ballistic stage of flight.

In addition, cryogenic thruster assemblies with a reignitable main thruster normally include at least one settling thruster, i.e. a secondary thruster that operates during the so-called "ballistic" stage of flight in order to maintain a low level of acceleration so as to press the liquid propellant against the bottoms of the cryogenic tanks, thereby ensuring that the main thruster is fed while it is being reignited. Typically, such settling thrusters are fed with liquid or gaseous propellants from tanks that are separate from the cryogenic tanks. In order to control the steering of such a cryogenic thruster assembly, it is also common practice to fit it with steering control nozzles that are typically fed with cold gas, and that also implies the need for separate gas tanks.

The invention seeks to propose a cryogenic thruster assembly comprising at least: a reignitable main thruster; a first cryogenic tank connected to the main thruster to feed it with a first propellant; a first gas tank; and at least one settling thruster; and that makes it possible to continue delivering propellant in the gaseous state to the first gas tank even during a so-called "ballistic" stage of flight in which the main thruster is extinguished. Thus, a gas tank of small volume can satisfy various gas needs during the so-called "ballistic" stage of flight, such as, for example: repressurizing the first cryogenic tank, feeding the settling thruster, and/or feeding the steering control thruster.

In a first aspect, this object is achieved by the fact that the cryogenic thruster assembly also comprises a first feed circuit for feeding the first gas tank, the first feed circuit being connected to the first cryogenic tank and having a heat exchanger for using heat given off by the at least one settling thruster to vaporize a liquid flow of the first propellant as extracted from the first cryogenic tank in order to feed the first gas tank with the first propellant in the gaseous state. By means of these provisions, the heat given off by the settling thruster can be used during the so-called ballistic stage of flight in order to heat and vaporize the first propellant and thus actively deliver a flow of gas to the first gas tank even during this stage of flight. The volume and thus the mass of the first gas tank can be made smaller in this way, even if the gas it contains needs to be used during the so-called "ballistic" stage of flight, whereas the mass and the complexity of the heater means also remain limited. In particular, the first gas tank may be connected to the first cryogenic tank in order to pressurize it, and/or to the settling thruster, and/or to at least one steering control thruster that also forms a portion of the cryogenic thruster assembly, in order to feed them. The first gas tank may thus supply the gas needs of these elements of the cryogenic thruster assembly with the first propellant previously received in the gaseous state in this first gas tank via its first feed circuit. The first feed circuit of the first gas tank may also include at least one feed pump in order to ensure forced circulation of the first propellant to the first gas tank.

In a second aspect, the cryogenic thruster assembly further comprises a second feed circuit for feeding the first gas tank, the second feed circuit being connected to the first cryogenic tank and including a heat exchanger for using heat given off by the main thruster to vaporize a liquid flow of the first propellant extracted from the first cryogenic tank in order to feed the first gas tank with the first propellant in the gaseous state. In particular, the second feed circuit of the first gas tank may be a branch connection on a circuit for feeding the main thruster. In this way, the first gas tank can already be fed with gas during first ignition of the main thruster, and also during subsequent ignitions.

In a third aspect, the cryogenic thruster assembly further comprises a second cryogenic tank connected to the main thruster to feed it with a second propellant, a second gas tank, and a first feed circuit for feeding the second gas tank, the first feed circuit being connected to the second cryogenic tank and including a heat exchanger for using heat generated by the at least one settling thruster to vaporize a liquid flow of the second propellant extracted from the second cryogenic tank in order to feed the first gas tank with the first propellant in the gaseous state. In this way, this second gas tank can be fed with a flow of the second propellant in the gaseous state during the so-called "ballistic" stage of flight, it being possible for example for this second propellant in the gaseous state to be used for repressurizing the second cryogenic tank, and/or for feeding the at least one settling thruster and/or the steering control thruster, regardless of whether they use one or two propellants.

The invention also provides an upper stage of a satellite vehicle launcher including such a cryogenic thruster assembly. It is particularly useful in such vehicles for the main thruster to have the ability to be reignited, in particular for jointly launching a plurality of satellites onto different orbits or for the final placing of satellites on orbit.

The invention also provides a method of feeding a first gas tank of a cryogenic thruster assembly with a first propellant in the gaseous state. In a first aspect of this method, when a reignitable main thruster is extinguished and at least one settling thruster is ignited, the method comprises the following steps: extracting a liquid flow of the first propellant from a first cryogenic tank via a first feed circuit for feeding the first gas tank, and vaporizing it in a heat exchanger of said first feed circuit of the first gas tank by means of heat given off by the at least one settling thruster, prior to delivering it to the first gas tank. The first gas tank is thus fed with gas during this so-called "ballistic" stage of flight. By way of example, this gas can subsequently be used for repressurizing the first cryogenic tank, and/or for feeding the settling thruster, and/or steering control thrusters, and/or other devices such as fuel cells, an ignition torch, and/or fluidic actuators.

In a second aspect, when the main thruster is ignited, the method comprises the following steps: extracting a first liquid flow of the first propellant from the first cryogenic tank via a second feed circuit for feeding the first gas tank, and vaporizing it in a heat exchanger of the second feed circuit of the first gas tank by means of heat given off by the main thruster prior to delivering it to the first gas tank. The first gas tank is thus also fed with gas during this other stage of flight.

In this way, it is possible to feed not only a first gas tank with a first propellant in the gaseous state, but also simultaneously a second gas tank with a second propellant in the gaseous state. Thus, when the reignitable main thruster is extinguished and at least one settling thruster is ignited, a liquid flow of a second propellant can be extracted from a second cryogenic tank via a first feed circuit of the second gas tank, and it can be vaporized in a heat exchanger of said first feed circuit of the second gas tank using heat given off by the at least one settling thruster, prior to being delivered to the second gas tank.

Analogously, when the main thruster is ignited, a liquid flow of the second propellant can be extracted from the second cryogenic tank via a second feed circuit of the second gas tank, and it can be vaporized in a heat exchanger of the second feed circuit of the second gas tank using heat given off by the main thruster, prior to being delivered to the second gas tank. Like the gas from the first tank, the gas from this second tank can then be used, by way of example, for repressurizing the corresponding cryogenic tank, for feeding the settling thruster, for feeding the steering control thrusters, and/or for feeding other elements, such as fuel cells, thruster ignition torches, and/or fluidic actuators.

The invention can be well understood and its advantages appear better on reading the following detailed description of an embodiment given by way of non-limiting example. The description refers to the accompanying drawings, in which.

Figure 1:
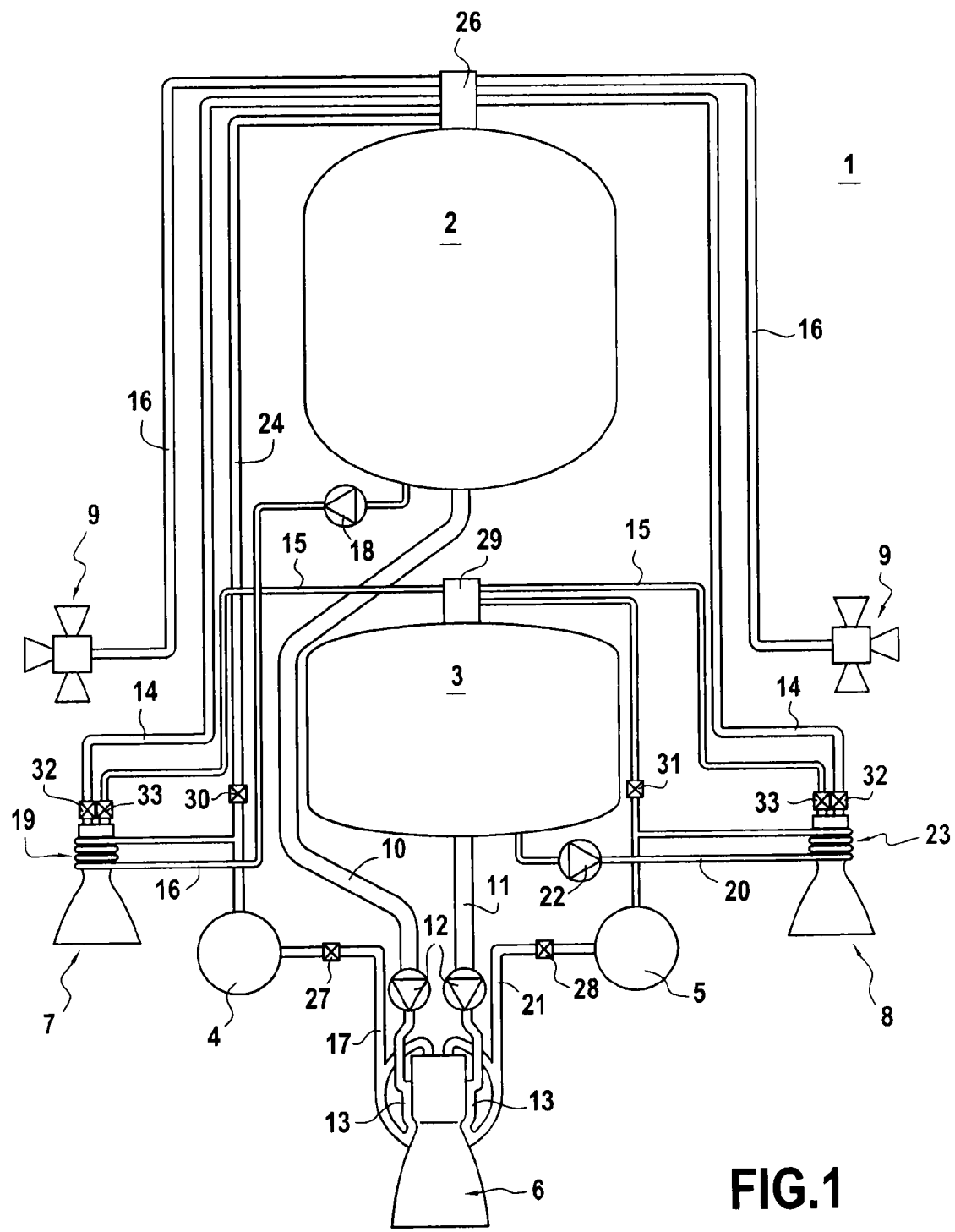
FIG. 1 is a diagrammatic view of a cryogenic thruster assembly in this embodiment.

In the field of rocket engines, the use of reignitable thrusters, in particular for the upper stages of satellite launch vehicles, has become quite commonplace. An upper stage fitted with a reignitable main thruster can enable a plurality of satellites to be launched together but on different orbits. A cryogenic thruster assembly 1 suitable for fitting to such an upper stage is shown diagrammatically in FIG. 1. As can be seen in this figure, the cryogenic thruster assembly 1 comprises a first cryogenic tank 2, a second cryogenic tank 3, a first gas tank 4, a second gas tank 5, a main thruster 6, a first settling thruster 7, a second settling thruster 8, and steering control thrusters 9. In the embodiment shown, the settling thrusters 7, 8 are two-propellant thrusters, whereas the steering control thrusters 9 are merely cold gas nozzles.

The first cryogenic tank 2 is connected to the main thruster 6 via a first feed circuit 10 of the main thruster 6, and the second cryogenic tank 3 is connected to the main thruster 6 by a second feed circuit 11 of the main thruster 6. Each of the first and second feed circuits 10 and 11 of the main thruster 6 has a respective turbopump 12 and heat exchanger 13 for pumping a liquid propellant from the corresponding cryogenic tank 2, 3 and for vaporizing it using heat generated by the main thruster prior to injecting it into a combustion chamber of the main thruster 6.

By way of example, the turbopump 12 may be actuated by the first propellant in the liquid state after it has passed through a vaporizing heat exchanger 13. Alternatively, the turbopumps may nevertheless also be actuated by hot gases generated in an auxiliary combustion chamber likewise fed with propellant. Cryogenic turbopumps of both types are well known to the person skilled in the art in the field of cryogenic thruster assemblies. The heat exchangers 13, typically incorporated in the nozzle of the main thruster, are also well known to the person skilled in the art.

Each of the two cryogenic tanks 2 and 3 is designed to contain a different propellant in the liquid state at very low temperature. Thus, the first cryogenic tank 2 is designed to contain a first propellant, e.g. such as a liquid hydrogen ($LH_2$), while the second cryogenic tank 3 is designed to contain a second propellant, e.g. such as liquid oxygen (LOX). The first and second propellants are suitable for reacting exothermally in the combustion chamber of the main thruster 6.

The first gas tank 4 and the second gas tank 5 are also designed respectively for containing the first propellant and the second propellant, but in the gaseous state and at an intermediate pressure between the pressure of each propellant in its cryogenic tank and the pressure at which each propellant is injected into the combustion chamber of the main thruster 6.

The first gas tank 4 is connected to the bottom of the first cryogenic tank 2 via first and second circuits 16 and 17 for feeding the first gas tank 4. The first feed circuit 16 of the first gas tank 4 has a pump 18 and a heat exchanger 19 respectively for pumping the first propellant in the liquid state from the first cryogenic tank 2 and for vaporizing it with heat generated by the first settling thruster 7 in order to deliver this first propellant in the liquid state to the first gas tank 4 when the first settling thruster 7 is ignited. The second feed circuit 17 of the first gas tank 4 has a segment in common with the first feed circuit 10 of the main thruster 6 but branching therefrom, downstream from the turbopump 12 and the heat exchanger 13, via a valve 27 suitable for opening the circuit 17 in order to deliver the first propellant in the liquid state to the first gas tank 4 when the main thruster 6 is ignited, and to close the circuit 17 when the main thruster 6 is extinguished. The first gas tank 4 is also connected to a manifold 26 for the first propellant via a duct 24 having a valve 30. This manifold 26 is in turn connected to the top of the first cryogenic tank 2, to a first feed circuit 14 for feeding the settling thrusters 7, 8, and to a feed circuit 16 for feeding the steering control thrusters 9.

The second gas tank 5 is connected to the bottom of the second cryogenic tank 3 via first and second feed circuits 20, 21 for feeding the second gas tank 5. The first feed circuit 20 of the second gas tank 5 has a pump 22 and a heat exchanger 23 respectively for pumping the second propellant in the liquid state from the second cryogenic tank 3 and for vaporizing it with heat generated by the second settling thruster 8 in order to deliver this second propellant in the liquid state to the second gas tank 5 when the second settling thruster 8 is ignited. The second feed circuit 21 of the second gas tank 5 has a segment in common with the second feed circuit 11 of the main thruster 6 but branching therefrom, downstream from the turbopump 12 and the heat exchanger 13 via a valve 28 suitable for opening the circuit 21 in order to deliver the second propellant in the liquid state to the second gas tank 5 when the main thruster 6 is ignited, and in order to close the circuit 21 when the main thruster 6 is extinguished. The second gas tank 5 is also connected to a manifold 29 via a duct 25 having a valve 31. This manifold 29 is in turn connected to the top of the second cryogenic tank 3 and to a second feed circuit 15 for feeding the settling thrusters 7, 8.

The first and second feed circuits 14 and 15 of the settling thrusters also include valves 32, 33 for controlling the passage respectively of the first and second propellants to the settling thrusters 7, 8. The steering control thrusters also include control valves (not shown) for delivering the first propellant to the various nozzles. Some or all of the valves of the cryogenic thruster assembly 1, and also the pumps 18 and 22 may optionally be connected to a control unit (not shown) for controlling the fluid flow rate in each circuit.

Figure 2:
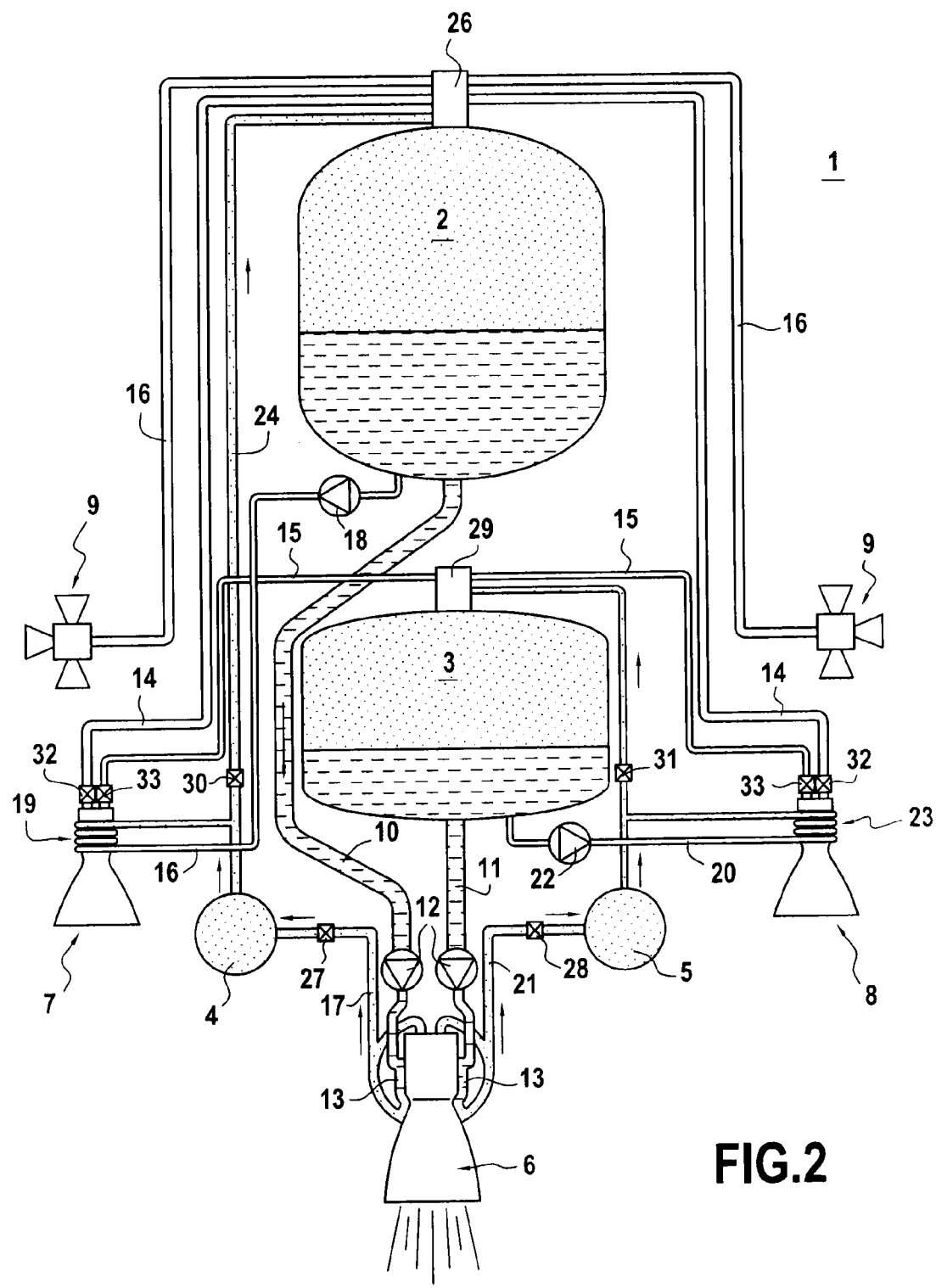
FIG. 2 is a diagrammatic view of the flow of propellant in the cryogenic thruster assembly of FIG. 1 when a main thruster is ignited.

In operation, in a launcher fitted with a cryogenic thruster assembly 1 as its upper stage, the cryogenic tanks 2, 3 and the gas tanks 4, 5 are normally filled with propellant before launch. Thus, prior to separation of the upper stage, the pressure in the gas tanks 4, 5 may be used for pre-pressurizing the cryogenic tanks 2, 3 in order to cool the feed circuits 10, 11 of the main thruster 6 and enable it to be ignited for the first time. After this first ignition, during a first stage of flight in which the main thruster 6 remains ignited, the valves 27, 28 remain open. Thus, in the manner shown in FIG. 2, a gaseous flow of the first propellant is taken off via the second feed circuit 17 of the first gas tank 4 in order to refill the first gas tank 4, while a gaseous flow of the second propellant is taken off via the second feed circuit 21 of the second gas tank 5 in order likewise to refill the second gas tank 5. Since both propellants are taken from the feed circuits 10, 11 of the main thruster 6 downstream from the turbopumps 12 and the heat exchangers 13, they are delivered in the gaseous state to the respective gas tanks 4, 5. Conventionally, these gas flow rates also serve to maintain pressure in the cryogenic tanks 2, 3 while the main thruster 6 is in operation.

Figure 3:
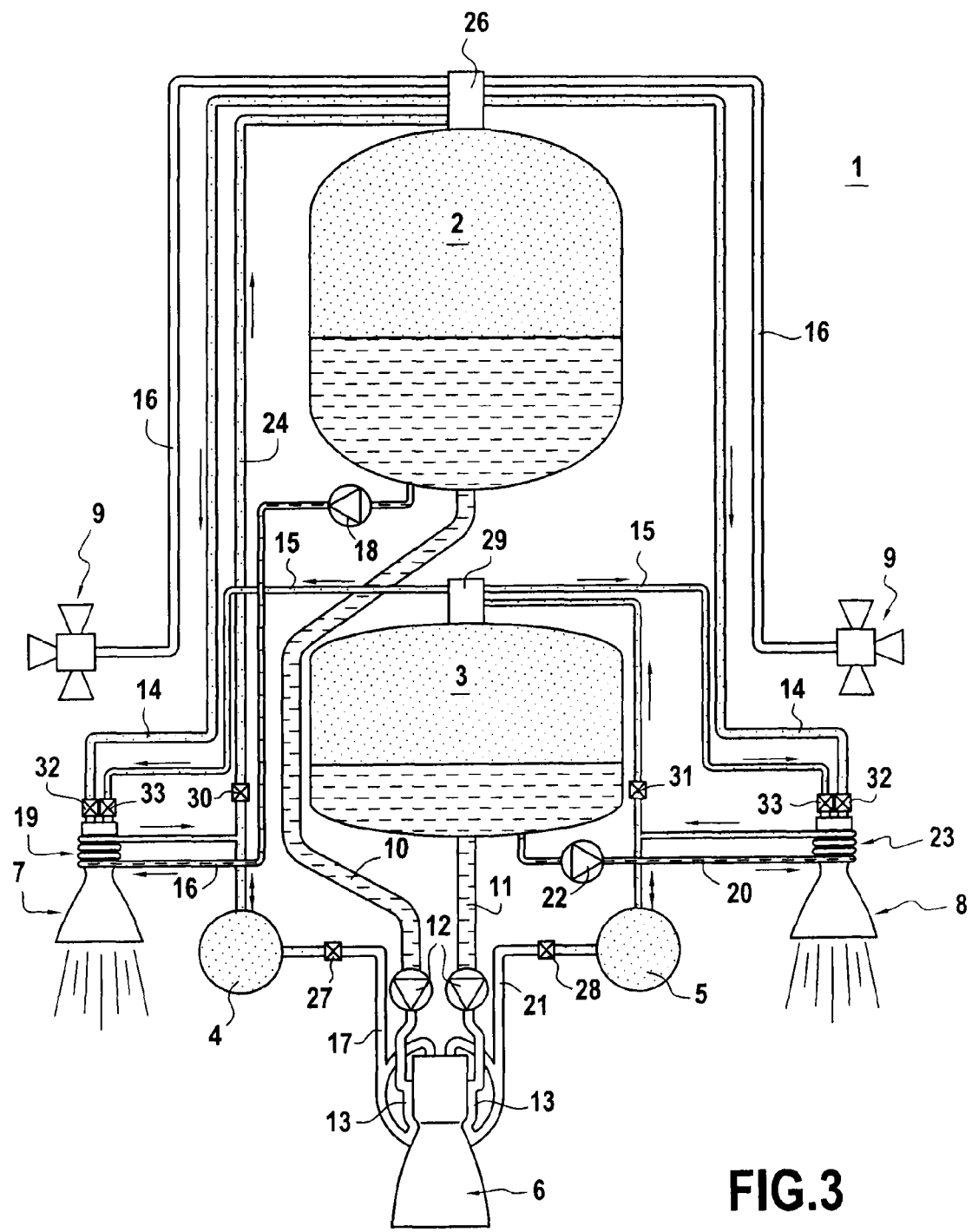
FIG. 3 is a diagrammatic view of the flow of propellant in the FIG. 1 cryogenic thruster assembly during a so-called "ballistic" stage of flight, with the main thruster extinguished.

Immediately prior to extinguishing the main thruster 6 in order to embark on a so-called "ballistic" stage of flight, the settling thrusters 7 and 8 are ignited. Thus, although this stage of flight is said to be "ballistic", the settling thrusters 7 and 8 maintain a small amount of acceleration in the cryogenic thruster assembly 1 so as to continue to press the liquid propellant against the bottoms of the cryogenic tanks 2, 3. Like the main thruster 6, the settling thrusters 7 and 8 are two-propellant thrusters fed with the first and second propellants. Nevertheless, as shown in FIG. 3, the propellants are delivered directly in the gaseous state to the settling thrusters 7 and 8 from the gas tanks 4 and 5. For this purpose, the valves 30, 31, 32, and 33 are opened, and the propellants flow via the ducts 24, 25 to the manifolds 26, 29, and from the manifolds 26, 29 via the first and second feed circuits 14, 15 of the settling thrusters 7, 8. In order to continue to feed the gas tanks 4 and 5 during the ballistic stage of flight, the pumps 18 and 22 are activated in order to deliver the first and second propellants from the cryogenic tanks 2, 3 and respectively via the first feed circuit 16 of the first gas tank 4 and the first feed circuit 20 of the second gas tank 5. The propellants flowing via these circuits 16 and 20 are vaporized respectively in the heat exchangers 19 and 23 by heat generated by the settling thrusters 7 and 8. They are thus delivered in the gaseous state to the gas tanks 4 and 5. Although in the embodiment shown each of the heat exchangers 19 and 23 is associated with a different settling thruster, it is naturally obvious for the person skilled in the art to adopt other arrangements that are broadly equivalent. For example, at least one of the settling thrusters could be associated with at least one heat exchanger for each of the two propellants.

Figure 4:
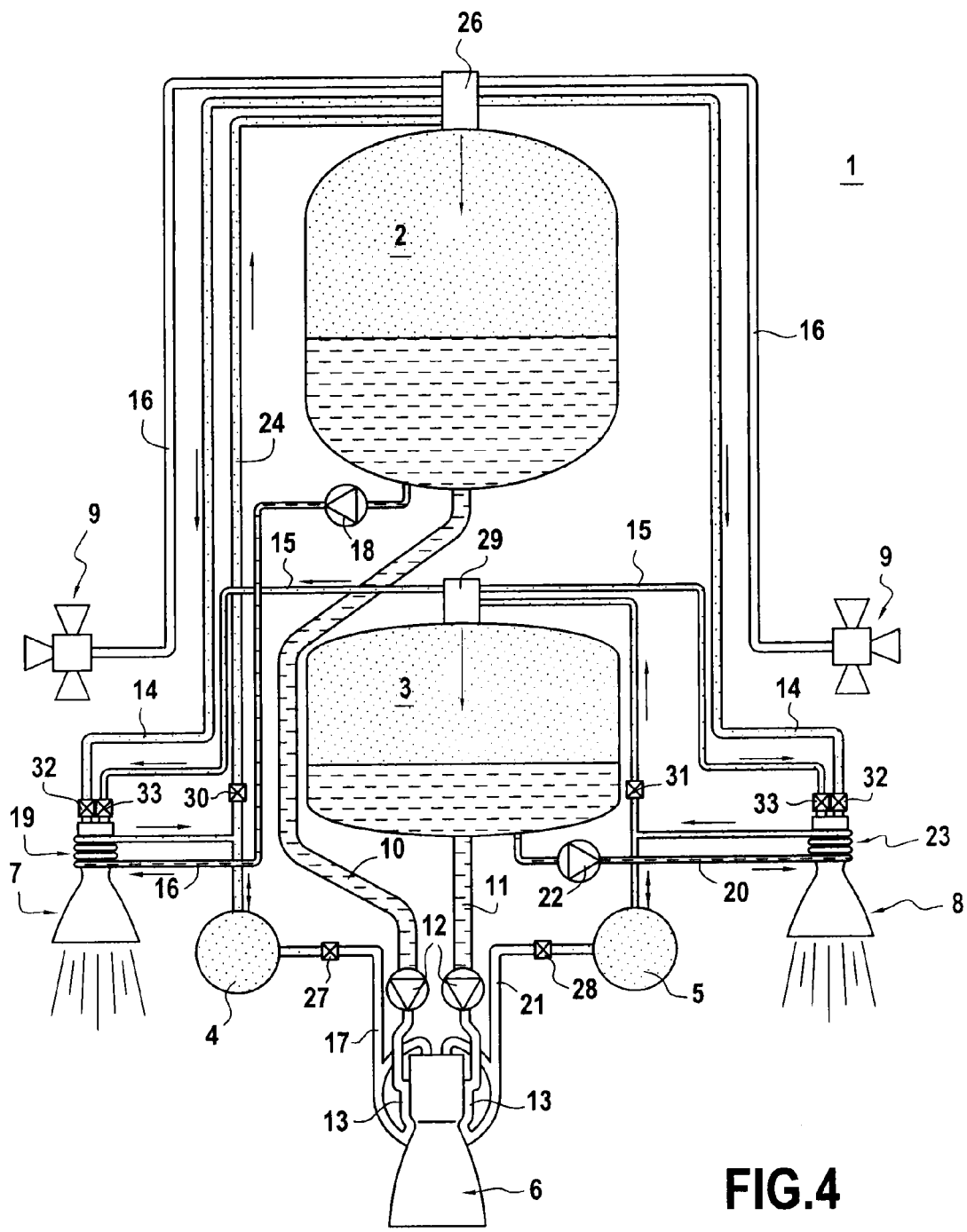
FIG. 4 is a diagrammatic view of the flow of propellant in the FIG. 1 cryogenic thruster assembly while re-pressurizing cryogenic tanks prior to reigniting the main thruster at the end of a ballistic stage of flight.

During the ballistic stage of flight, the cryogenic tanks 2, 3 are depressurized down to the saturation pressures of the propellants in order to be able to keep control over the temperature of the liquid propellant. Before reigniting the main thruster 6, it is therefore appropriate to repressurize the cryogenic tanks 2, 3. In order to do this, the manifolds 26 and 29 put the ducts 24 and 25 into communication with the tops of the respective cryogenic tanks 2, 3, thereby forming two circuits for repressurizing the cryogenic tanks 2, 3 that are in communication with the gas tanks 4, 5, as shown in FIG. 4. When a predetermined pressure threshold is reached in each of the cryogenic tanks 2 and 3, the feed circuits 10, 11 of the main thruster 6 can be reactivated in order to feed the main thruster 6 with propellant, and the main thruster 6 can be reignited.

Figure 5:
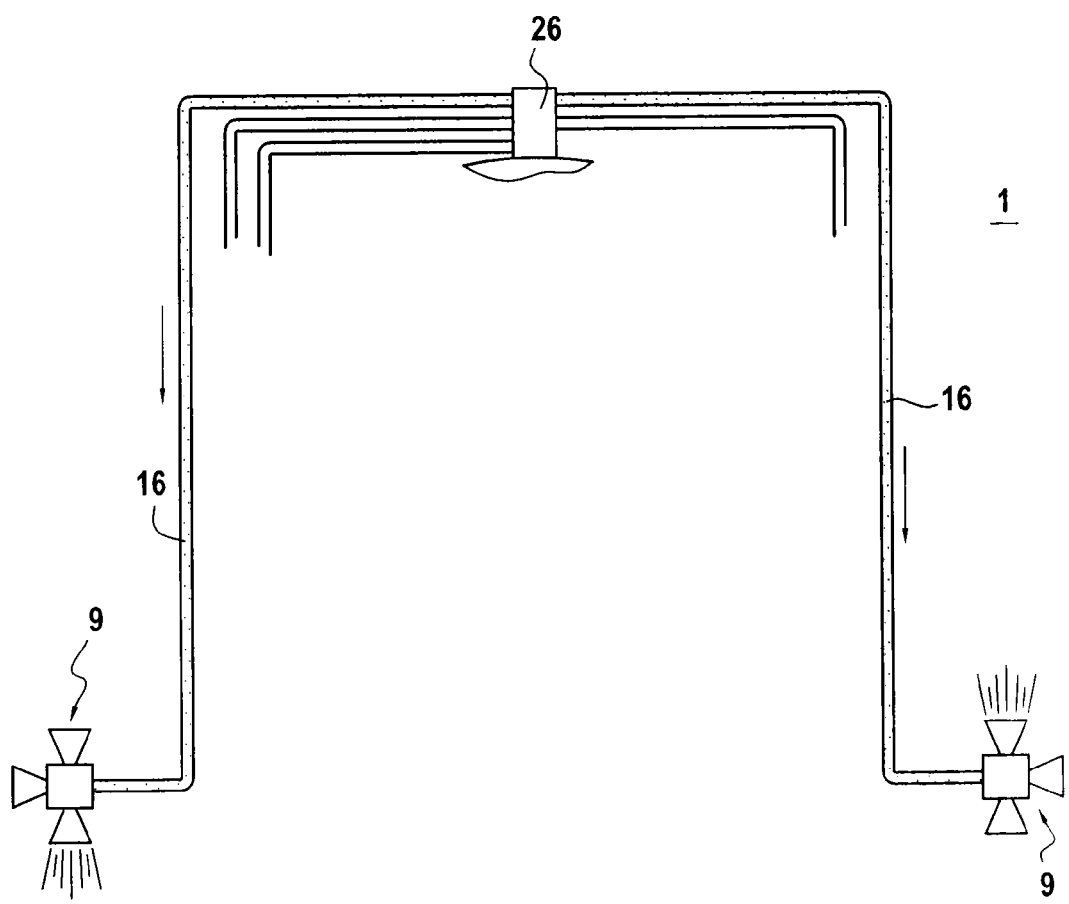
FIG. 5 is a diagrammatic view of the flow of a first propellant towards the attitude control thrusters in the FIG. 1 cryogenic thruster assembly.

In addition, during each of these various stages, the first gas tank 4 may also deliver the first propellant in the gaseous state to the steering control thrusters 9 via the duct 24, the manifold 26, and the feed circuit 16 of the steering control thrusters 9, as shown in FIG. 5. Controlled expulsion of this cold or lukewarm gas by the steering control thrusters 9 thus enables small lateral impulses to be imparted to the upper stage in order to control its steering and possibly its trajectory.

Thus, during these various stages of flight, the gas tanks 4 and 5 provide buffer capacities making it possible to reach the gaseous propellant flow rate required for feeding the settling thrusters 7, 8 and/or the steering control thrusters 9, and/or for pressurizing, maintaining the pressure, and/or repressurizing the cryogenic tanks 2, 3 when these combined flow rates exceed that which can be delivered by the various heat exchangers 13, 19 and/or 23. The gas tanks 4, 5 may then be refilled when the demand for gas diminishes.

Although the present invention is described with reference to specific embodiments, it is clear that various modifications and changes may be made to these embodiments without going beyond the general scope of the invention as defined by the claims. In particular, individual characteristics of the various embodiments may be combined in additional embodiments. Consequently, the description and the drawings should be considered in an illustrative sense rather than a restrictive sense.

The invention claimed is:

1. A cryogenic thruster assembly comprising:
   a reignitable main thruster;
   a first cryogenic tank connected to the reignitable main thruster to feed the reignitable main thruster with a first propellant;
   a first gas tank;
   at least one settling thruster;
   a first feed circuit to feed the first gas tank, the first feed circuit being connected to the first cryogenic tank and including a first heat exchanger to use heat given off by the at least one settling thruster to vaporize a liquid flow of the first propellant as extracted from the first cryogenic tank to feed the first gas tank with the first propellant in a gaseous state; and
   a second feed circuit to feed the first gas tank, the second feed circuit being connected to the first cryogenic tank and including a second heat exchanger to use heat given off by the reignitable main thruster to vaporize the liquid flow of the first propellant extracted from the first cryogenic tank to feed the first gas tank with the first propellant in the gaseous state.

2. The cryogenic thruster assembly according to claim 1, wherein the first gas tank is connected to the at least one settling thruster to feed the at least one settling thruster.

3. The cryogenic thruster assembly according to claim 1, wherein the first gas tank is connected to the first cryogenic tank to pressurize the first cryogenic tank.

4. The cryogenic thruster assembly according to claim 1, further comprising at least one steering control thruster connected to the first gas tank.

5. The cryogenic thruster assembly according to claim 1, wherein the first feed circuit of the first gas tank further comprises at least one feed pump.

6. The cryogenic thruster assembly according to claim 1, further comprising:
   a second cryogenic tank connected to the reignitable main thruster to feed the reignitable main thruster with a second propellant;
   a second gas tank; and
   a third feed circuit to feed the second gas tank, the third feed circuit being connected to the second cryogenic tank and including a third heat exchanger to use heat generated by the at least one settling thruster to vaporize a liquid flow of the second propellant extracted from the second cryogenic tank to feed the second gas tank with the second propellant in the gaseous state.

7. An upper stage of a space vehicle launcher, the upper stage comprising:
   a cryogenic thruster assembly including:
      a reignitable main thruster;
      a first cryogenic tank connected to the reignitable main thruster to feed the reignitable main thruster with a first propellant;
      a first gas tank;
      at least one settling thruster;
      a first feed circuit to feed the first gas tank, the first feed circuit being connected to the first cryogenic tank and including a first heat exchanger to use heat given off by the at least one settling thruster to vaporize a liquid flow of the first propellant as extracted from the first cryogenic tank to feed the first gas tank with the first propellant in a gaseous state; and
      a second feed circuit to feed the first gas tank, the second feed circuit being connected to the first cryogenic tank and including a second heat exchanger to use heat given off by the reignitable main thruster to vaporize the liquid flow of the first propellant extracted from the first cryogenic tank to feed the first gas tank with the first propellant in the gaseous state.

8. A method of feeding a first gas tank of a cryogenic thruster assembly with a first propellant in a gaseous state, wherein a reignitable first thruster is extinguished and at least one settling thruster is ignited, the method comprising:
   extracting a liquid flow of the first propellant from a first cryogenic tank via a first feed circuit to feed the first gas tank;
   vaporizing the liquid flow of the first propellant in a first heat exchanger of the first feed circuit of the first gas tank by heat given off by the at least one settling thruster, prior to delivering the first propellant in the gaseous state to the first gas tank; and
   when the reignitable first thruster is ignited:
      extracting the liquid flow of the first propellant from the first cryogenic tank via a second feed circuit to feed the first gas tank; and
      vaporizing the liquid flow of the first propellant extracted via the second feed circuit of the first gas tank in a second heat exchanger of the second feed circuit of the first gas tank by heat given off by the reignitable first thruster prior to delivering the first propellant in the gaseous state to the first gas tank.

* * * * *